United States Patent Office 3,088,284
Patented May 7, 1963

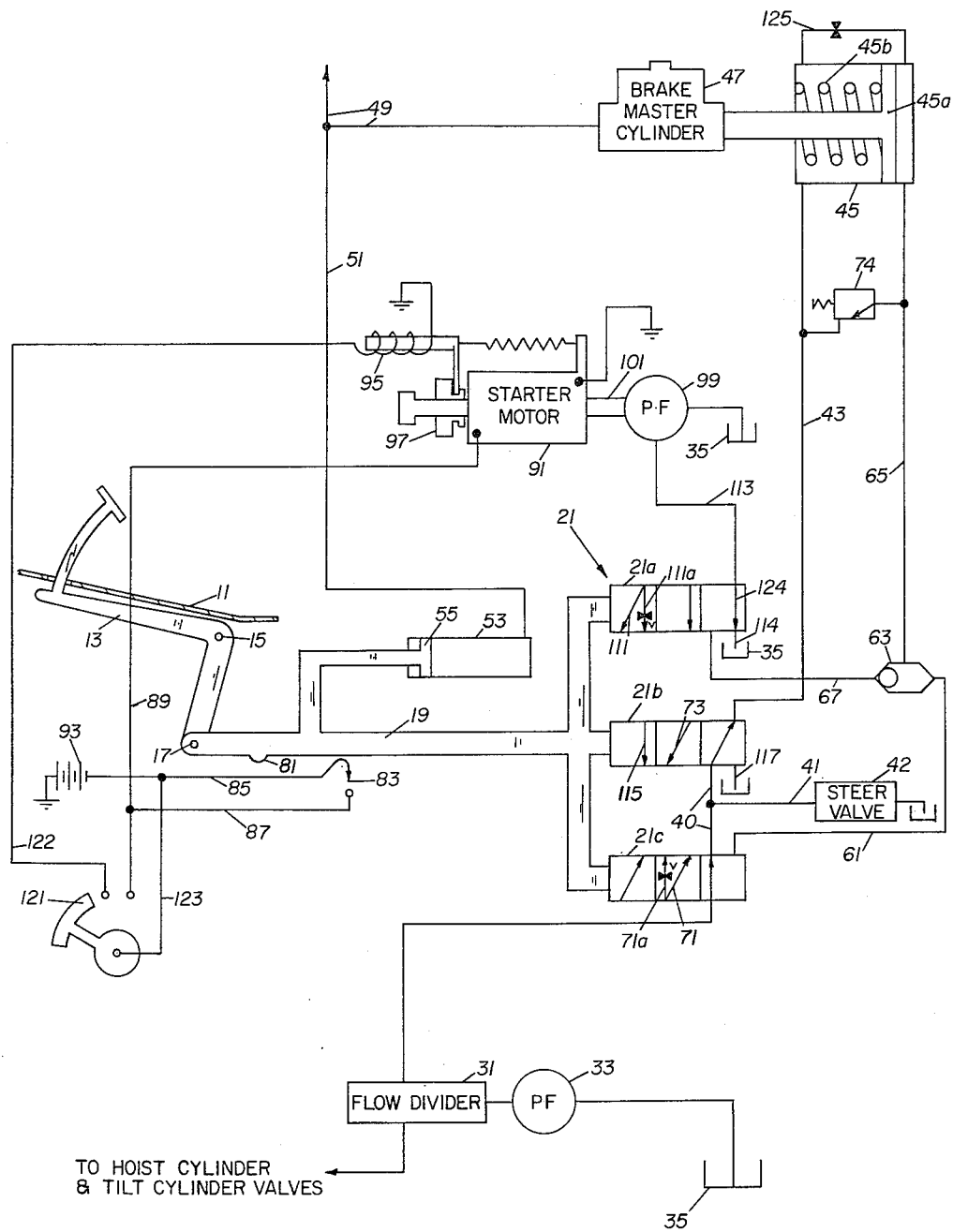

3,088,284
VEHICLE HAVING EMERGENCY EQUIPMENT
James R. Aaron, Portland, Oreg., assignor to Hyster Company, Portland, Oreg., a corporation of Nevada
Filed Jan. 9, 1961, Ser. No. 81,487
1 Claim. (Cl. 60—52)

This invention relates to emergency equipment, particularly emergency equipment for vehicles such as industrial lift trucks.

It is known to utilize accumulators in vehicles of various types to enable limited operation of certain mechanisms on the vehicles, in the event that the usual means for operating the mechanisms is inactive. Accumulators are expensive and bulky, and allow only limited operation of the desired mechanisms. For convenience, the provision of such auxiliary power means will be called emergency equipment.

It is a main object of the present invention to provide in a vehicle emergency equipment, the primary parts of which comprise parts already on the vehicle.

A more specific object is to provide a powered vehicle constructed so that the starter motor can be utilized under emergency conditions as a source of power for operating various mechanisms of the vehicle, such as the brakes, power steering devices and the like, without the starter motor being connected in driving relation to the vehicle engine.

Various other objects of the invention will be apparent from the following description taken in connection with the accompanying drawings wherein:

The single figure of the drawings shows a schematic diagram disclosing the invention.

The invention will be described as having been incorporated in an industrial lift truck, but its applicability to other vehicles is obvious. Referring to the drawings, the truck includes a floor board 11 through which projects the foot engaging portion of a brake pedal 13. The pedal is shown in its elevated inoperative position. The pedal is pivotally mounted intermediate its length at 15 and has its lower end pivotally connected at 17 to a linkage 19. The linkage is schematically shown and is connected to a three position valve 21 which for convenience is shown as including three sections or portions 21a, 21b and 21c.

In practice, the three sections preferably constitute a single spool valve.

The spools of the valve sections are shown in their first positions. When the spools are shifted so that the central blocks occupy the positions of the right-hand blocks, the valve sections are in their second positions. When the left-hand blocks occupy the positions of the right-hand blocks, the valve sections are in their third positions.

The valve section 21c controls the flow of fluid from a flow divider 31 which is supplied with fluid from a pump 33. The pump is driven by the engine of the truck and obtains fluid from a tank 35. The flow divider sends part of the fluid from the tank 35 to the valve section 21c and the remainder to the truck hoist cylinder valve (not shown) and truck tilt cylinder valve (not shown).

In its first position, as shown in the drawing the spool of valve section 21c routes fluid through a line 40 and a steering valve line 41 to a steering valve 42, and to the valve section 21b, which sends fluid through a line 43 to the rod end of a hydraulic booster cylinder unit 45. The unit includes a piston 45a urged to the right by a spring 45b. The booster cylinder unit is connected to a brake master cylinder unit 47 which delivers fluid to the hydraulic brakes of the truck through a line (or lines) 49. Steering valve 42 will always permit the passage of fluid through line 41. The fluid either goes to the tank as indicated diagrammatically or is diverted by the steering valve through one of the steering cylinders, now shown. Thus, after piston 45a is fully retracted, excess fluid can pass through line 41.

A conventional feedback system is provided so that there is increasing resistance to depression of the pedal 13, so that the operator can "feel" the application of the brakes. This system includes a line 51, a cylinder 53, and a piston 55 connected to the linkage 19.

The valve 21c is connected by a line 61 to one side of a shuttle valve 63, which is connected by a line 65 to the right-hand end of the cylinder unit 45. A line 67 connects the shuttle valve 63 to valve section 21a.

Normal Brake Operation

When it is desired to apply the brakes, the pedal 13 is depressed to shift the spools of the valve sections to the right toward their second positions. As soon as a passage 71 of valve section 21c is aligned with line 61, fluid from the pump 33 will be supplied in varying amount through the shuttle valve to the booster cylinder unit 45 to apply the brakes. The operator "feels" this through the feedback line 51 and of course depresses the pedal no farther. Thus the valve sections are now disposed essentially in their second positions.

The operator can regulate the pressure applied to the brakes by slight movement of the pedal 13 to favor passage 71 or to favor a variable restriction orifice or passage 71a. If passage 71 is favored to the exclusion of passage 71a, all the fluid will pass through 71 to line 61. If passage 71a is favored to the exclusion of passage 71, all the fluid will pass unrestrictedly through passage 71a to the steering valve lines 40 and 41. In intermediate favoring positions, the passages 71 and 71a function as a flow divider to pass part of the fluid to line 61 and part to line 40. Thus the operator can regulate the pressure applied to the piston 45a of the booster unit 45 and thus vary the pressure applied to the brakes. More in particular, in the center of passages 71, 71a, 111 and 111a I show the JIC code for a variable restriction; being a solid V on each side of the passage accompanied by the letter "V". The restriction in each case is varied by controlling the amount of port overlap and interference by positioning the spool slightly off center. This construction is common to all spool valves and is well known in the art. The ports are so located that with valve 21c in intermediate position both restrictions will be substantially zero. A slight movement of the spool to the left will increase the restriction through passage 71a and cause more fluid to flow through passage 71 to line 61, to brake booster cylinder 45 and the brakes will be applied. Similarly, if spool 21c is positioned a little to the right of center, the flow through line 40 will be increased and the flow through line 61 will be decreased. This will tend to release the brakes. Thus, the operator can regulate the pressure applied to the brakes.

During the movement of the piston 45a of unit 45 to the left, fluid from the rod end of the cylinder unit 45 passes through the line 43 and a passage 73 of valve section 21b into the line 40, where it can flow through the line 41 to the steering valve 42.

A relief valve 74 is connected between the lines 43 and 65 as shown, so that the pressure in line 65 cannot exceed a predetermined value. When the pressure is exceeded, the valve feeds fluid through line 43 and valve sections 21b to the steering valve lines 40 and 41.

When pressure on the pedal 13 is released, a spring, (not shown) causes elevation of the pedal and release of the brakes.

In the truck shown, the hydraulic brakes are not used for parking purposes, a separate system being provided.

Emergency System

If it is assumed that the pump 33 fails, or the engine dies or is not in operation or for any other reason the pump 33 fails to deliver fluid under pressure to the cylinder unit 45, there will of course be no feedback of pressure to the linkage 19, and thus the driver or operator will depress the pedal 13 the full extent. This will bring an actuator 81 on the linkage 19 into contact with a switch 83 to close the switch. This will operate through conductors 85, 87 and 89 to energize the starter motor 91 from the vehicle battery 93, without however energizing the pinion-engaging solenoid 95. Thus the pinion 97 will not be kicked over into engagement with the flywheel gear (not shown) and the starter motor is free to drive an auxiliary or emergency pump 99. The pump is drivingly connected to the starter motor, such as by mounting the pump impeller on the motor shaft 101.

Full depression of the pedal 13 will also operate through the linkage 19 to shift the spools of the valve sections 21a, 21b and 21c fully to the right to their third positions. This will bring a passage 111 of the valve section 21a into alignment with an output line 113 from pump 99, to conduct fluid under pressure to the booster cylinder unit 45 through line 67 and valve 63.

A variable restriction orifice or passage 111a is provided in conjunction with passage 111 to provide a flow divider like passages 71a and 71. Fluid from passage 111a passes to an exhaust line 114. The brake pressure when booster cylinder is supplied by pump 99 as above described can be adjusted by the operator in the same manner described in the discussion of normal brake operation.

Full depression of the pedal 13 also brings a passage 115 of valve section 21b into alignment with an exhaust line 117 so that fluid from the rod end of the cylinder unit 45 and overflow fluid from the valve 74 will pass to the tank 35.

Thus, the brakes are applied despite the failure of the pump 33, and may be repeatedly applied over a considerable period of time because the battery 93 constitutes a substantial source of energy for the emergency system.

As before mentioned, the solenoid 95 is not energized when switch 83 is closed. The solenoid may be energized in the usual manner by a starter switch 121 and conductors 122 and 123. The switch will also function to energize the starter motor 91 from the battery, simultaneously with energizing the solenoid.

When the switch 121 is closed to energize the starter motor, the pump 99 operates under no load because its output line 113 is connected by a passage 124 of the valve section 21a to the exhaust line 114.

Preferably, the piston of the cylinder unit 45 is provided with a metal piston ring to allow sufficient leakage so that the piston will not be trapped in a brake-on position, but will always be free to return to its brake-off position under the influence of a spring conventionally provided in the master cylinder 47. This controlled leakage is indicated by a restriction line 125.

The shuttle valve 63 prevents steering oil in line 41 from leaking through the valve section 21a and then through emergency pump 99 when the pedal 13 is in its normal braking range and the emergency pump is not running.

In the event of failure of the pump 33, the movable valve element of the shuttle valve will assume its right-hand position so that flow to the cylinder unit 45 will be from the emergency pump 99, and the oil will not escape through the faulty steering circuit.

While the system in the drawings shows the emergency supply of fluid to the brake actuating system, emergency fluid could also be supplied to the steering system or in fact any other fluid motor means of the truck. In the event emergency fluid is supplied to fluid motor means not including the brake actuating system, a manually operated emergency switch could be provided.

It will be noted that passages 111a and 115, when in operative position are connected to the tank 35 rather than to the steering valve line 40. This means that the pump 99 need operate only the brakes. This reduces the load on the pump 99, and thus the load on the motor 101 and the battery 93. However, it is contemplated that the passages 111a and 115, when in operative position, will be connected to the steering valve to enable continued power steering. This may be done by connecting line 114 to line 43 and changing passage 115 so that it connects to the steering line 40. Instead of changing line 115, the valve 21b could be eliminated and line 43 connected directly to line 40.

Having described the invention in what is considered to be the preferred embodiment thereof, it is desired that it be understood that the invention is not to be limited other than by the provisions of the following claim.

I claim:

In a wheeled vehicle having an engine, a fluid motor for operating a mechanism on said vehicle, an engine-driven pump for supplying fluid under pressure to said fluid motor, a starter motor for said engine, a starter-motor-driven pump for supplying fluid under pressure to said fluid motor, first control means for energizing said starter motor without drivingly connecting said starter motor to said engine, valve means for placing said pumps in communication with said fluid motor or for isolating said pumps from said motor, and a common means for actuating said control means and said valve means.

References Cited in the file of this patent

UNITED STATES PATENTS

| | | |
|---|---|---|
| 2,179,236 | Staude | Nov. 7, 1939 |
| 2,248,379 | Parsons | July 8, 1941 |
| 2,259,264 | Parsons | Oct. 14, 1941 |
| 2,275,511 | Parsons | March 17, 1942 |
| 2,365,557 | Keith | Dec. 19, 1944 |
| 2,845,916 | Pihiel | Aug. 5, 1958 |
| 2,946,326 | Bates et al. | July 26, 1960 |